May 18, 1926.
F. S. KERRIGAN
AIR MANIFOLD FOR LOCOMOTIVES
Filed Dec. 14, 1925
1,585,499
Fig.1.
Fig.2.
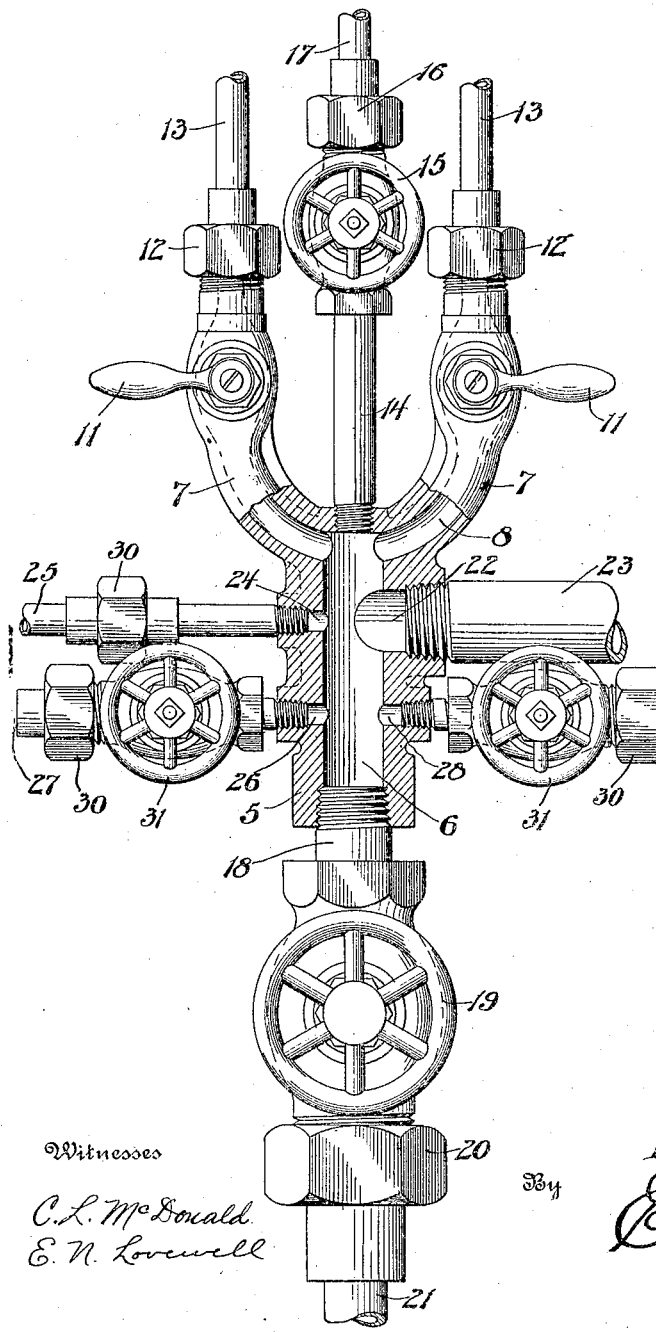
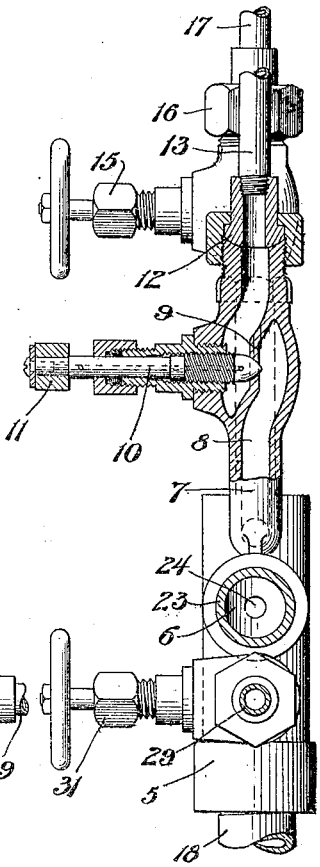
Witnesses
C. L. McDonald
E. N. Lovewell
Inventor
Frank S. Kerrigan
By E. G. Siggers
Attorney Patented May 18, 1926.

1,585,499

UNITED STATES PATENT OFFICE.

FRANK STEPHENS KERRIGAN, OF NASHVILLE, TENNESSEE.

AIR MANIFOLD FOR LOCOMOTIVES.

Application filed December 14, 1925. Serial No. 75,371.

This invention relates to an air manifold, especially adapted for use on locomotives for controlling various air-auxiliary devices, such as the means for operating the track sanders, bell ringer, fire door, power reverse gear, booster engine, cylinder cock lever and the like.

The object of the invention is to provide a simple and practical unitary device for the purpose stated to which all of the various valve controlled pipes may be directly connected by ball joints. Thus, all of the controls are arranged in a compact and convenient manner, much of the piping and the pipe fittings heretofore used are eliminated, and delays incident to their breakage are avoided.

The specific construction of the invention and the advantages resulting from its use will be more fully explained in detail in connection with the accompanying drawing, which illustrates one embodiment thereof.

In the drawing:

Figure 1 is a view, partly in elevation and partly in section, showing the manifold and the parts connected therewith.

Figure 2 is a sectional view taken at right angles to the plane of Figure 1.

The manifold comprises a main body portion 5, having a longitudinal bore 6, and having opposed branches 7 integrally connected to one end, with passageways 8, which communicate with the bore 6. A valve seat 9 extends across each of the passageways 8, and the opening therethrough is controlled by a valve 10 of well-known construction, and adapted to be opened or closed by a rotary movement effected by means of a handle 11. Each branch 7 is adapted to be connected by a ball joint 12 to a pipe 13 leading to one of the track sanders.

A hole is tapped into the end of the body portion 5 between the branches 7 and in alinement with the bore 6 for receiving a nipple 14, which leads through a valve 15, and a ball joint 16, to a pipe 17 leading to the bell ringer. The other end of the body portion 5 is threaded to receive a nipple 18 of comparatively large diameter, and connected through a valve 19 and ball joint 20 to a pipe 21 leading to the power reverse gear. A large opening 22 is tapped into the side wall of the bar 6 for receiving a comparatively large pipe 23 leading from the main air supply reservoir.

A number of other openings may be tapped into the wall of the bore 6 for connecting the same to various other air auxiliary devices. In the present embodiment, I have provided an opening 24 adapted to be connected through a pipe 25 to the means for operating the fire door, an opening 26 adapted to be connected by a pipe 27 to the booster engine, and an opening 28 adapted to be connected by a pipe 29 to the cylinder cock lever. These pipes also may have ball joint connections 30 and valves 31.

All parts of the manifold may be made from brass, or other suitable material, and the actual sizes of the various pipes and other parts may be determined according to their various functions. Various modifications may also be made in the minor details of the device without departing from the salient features of the invention as claimed.

What is claimed is:

An air manifold for locomotives comprising, in combination, a body portion with a longitudinal bore and having two oppositely disposed branches integrally connected to one end and formed with passageways therethrough communicating with said bore, valves for controlling said passageways, means for connecting a main air supply pipe to said body portion, means for connecting pipes to said branches for supplying air to the track sanders, a comparatively small valve controlled pipe connected to the end of said body portion between said branches for supplying air to the bell ringer, and a comparatively large valve-controlled pipe connected to the other end of the body portion for actuating the reverse gear, the wall of said body portion being also tapped for connection to other air-operated devices.

In testimony that I claim the foregoing as my own, I have hereto affixed my signature.

FRANK STEPHENS KERRIGAN.